United States Patent [19]

Cann

[11] Patent Number: 4,539,119

[45] Date of Patent: Sep. 3, 1985

[54] PROCESS FOR THE TREATMENT OF WASTE AND CONTAMINATED WATERS WITH IMPROVED RECOVERY OF ALUMINUM AND IRON FLOCCULATING AGENTS

[76] Inventor: Everett D. Cann, 5746 Forsythia Pl., Madison, Wis. 53705

[21] Appl. No.: 517,434

[22] Filed: Jul. 26, 1983

[51] Int. Cl.³ .................................................. C02F 1/52
[52] U.S. Cl. ..................................... 210/711; 210/712; 210/724; 210/737; 210/769; 210/906; 423/130; 423/131; 423/150
[58] Field of Search ................................. 210/710–712, 210/724, 726, 737, 769, 906; 423/130, 131, 150, 132

[56] References Cited

U.S. PATENT DOCUMENTS

| | | | |
|---|---|---|---|
| 3,268,443 | 8/1966 | Cann | 210/711 |
| 3,377,271 | 4/1968 | Cann | 210/711 |
| 3,377,272 | 4/1968 | Cann | 210/711 |
| 3,522,173 | 7/1970 | Lindman et al. | 210/906 |

FOREIGN PATENT DOCUMENTS 52-77452  6/1977  Japan .................................. 210/711

OTHER PUBLICATIONS

Lin, "Wastewater Treatment with an $SO_2$-Removal By-Product", *JWPCF*, Sep. 1975, pp. 2271–2280.

*Primary Examiner*—Peter Hruskoci

[57] ABSTRACT

Waste-containing (contaminated) waters are treated for reuse and disposal with acceptable environmental improvements by adding a sulfate salt of aluminum and/or iron alkalized to form a waste-cohering hydroxide floc in one or more treatment plants, recovering the flocs and wastes by contacting with sulfur oxides to redissolve the aluminum and/or iron for reuse, in which case low cost sulfur containing fuels are utilized to provide heat and sulfur for recovering over one-half of the sulfur dioxide for reuse and reducing the lime required to neutralize the acidity.

7 Claims, 1 Drawing Figure

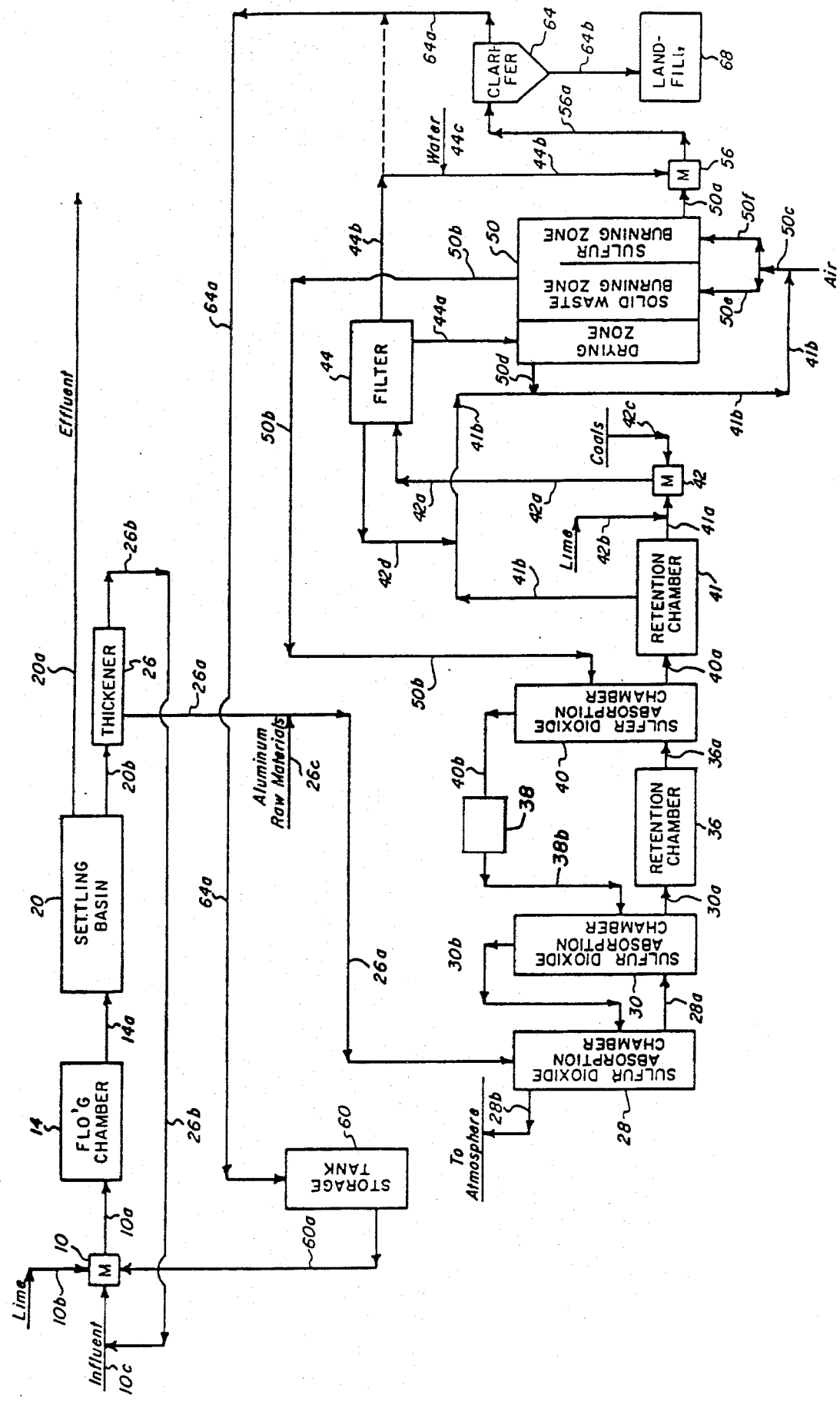

PROCESS FOR THE TREATMENT OF WASTE AND CONTAMINATED WATERS WITH IMPROVED RECOVERY OF ALUMINUM AND IRON FLOCCULATING AGENTS

This invention relates to further innovations of U.S. Pat. No. 3,268,443, which concerns with the treatment of domestic and industrial waste waters and waters contaminated by natural and public actions, particularly those containing suspended solids and also some waste materials in solution. These innovative improvements are directed to the recovery of aluminum and iron flocculating agents used in the effective treatment of such waste waters, and to improved waste water treatment processes resulting from such recovery. In particular, these innovative improvements provide for the complete recovery and reuse of the sulfur oxides, greatly reduced lime requirements, and the precipitation and subsequent removal of phosphates along with the solid wastes from the waste waters in conformance to the Federal and State environmental standards.

Efficient domestic (sewage) disposal is important to the health of the community particularly in respect to the removal of virus and bacteria from the waste waters by the use of aluminum and/or iron flocculating agents. Domestic (sewage) and industrial wastes, generally in the form of waste waters, containing varying amounts of suspended and dissolved organic and inorganic solids, must be properly treated to condition these waters before being released to rivers and lakes. The treated waters and the wastes removed therefrom must be discharged in conformance with the Federal and State Environmental Standards, so as not to degrade the existing environment.

A common treatment of waste waters containing suspended solids is to coagulate and flocculate the solids by introducing a flocculating agent such as alum (aluminum sulfate) and/or iron sulfate, which hydrolyse under weak acid to neutral conditions to form a sticky (gelatinous) floc. This floc combines with the suspended waste solids and effectively accelerate the gravity settling of these solids. In addition, flocculating agents coalesce any colloidally suspended waste solids, which would otherwise be immune to gravity setting. Also, proximate soluble pollutants, such as salts, biochemical oxygen demand (B. O. D.) materials, bacteria, virus, etc., coalesce and settle with these particular trivalent flocculating agents. As a result, a typical settling time of two or three hours without a flocculating agent may be shortened to about thirty minutes or so by using these flocculating agents and, moreover, more complete solids removal is accomplished. In terms of practical operating performance, flocculating chemicals can either reduce the size of the setting basins or chambers or can materially increase throughput of existing basins—often by a factor of four to six times. Indeed, many communities have been able by using flocculating agents to accomodate much larger loads without involving additional capital investment, and at the same time have improved the quality of the treated effluent. However, the advantages of flocculating agents are not without concurrent difficulties. Chief among these is the cost of aluminum and ferric sulfate, the flocculating agents of economic choice. It is, accordingly, a primary object of the recently revised and improved invention to provide a more economical method of recovering and recycling the sulfur dioxide for reuse in recovering these inorganic flocculating agents, which thereby permits more of these agents to be used without significantly increasing the cost so as to provide an improved operation of the waste water treatment process. The complete use of the sulfur oxides together with the simultaneous reduction of the time requirements provides a substantial advance to the present process and represents a marked innovation to the overall process.

Briefly, and in accordance with the present patent, I provide a revised and improved method of recovering the flocculating agent from the flocculant concentrate of the agent (in its hydroxide form) and waste solids so as to permit the solids to be disposed of and the flocculating agent to be recycled. This is accomplished by contacting the concentrate of the flocculating agent and the originally suspended solids with sulfur oxide gases to convert the hydroxide of the flocculating agent to the sulfate, sulfite and/or bisulfite, and by providing sufficient oxygen gas (air) to convert the sulfites and bisulfites to sulfates. The sulfate forms of aluminum and iron are water soluble, so that the aluminum and/or iron may be extracted from the concentrate and recycled to the waste water treatment process.

According to the preferred form of this revised invention, sulfur oxides are produced by controlled combustion of sulfur containing fuels and/or elemental sulfur fuels, and the flocculant concentrate of the flocculating agent and waste solids are contacted with the sulfur oxides in at least several gas-liquid absorption chambers. In the first chamber the gas is chiefly sulfur dioxide and air (oxygen); in the second it is mainly sulfur dioxide and air (oxygen) with some sulfur trioxide, and in the third it is sulfur dioxide, sulfur trioxides and air (oxygen). By the foregoing multichamber procedure efficient utilization is made of substantially all of the sulfur dioxide produced by burning sulfur containing fuels and/or elemental sulfur.

The invention in its various aspects will be more apparent in the ensuing description thereof.

BRIEF DESCRIPTION OF THE DRAWING

The attached single FIGURE shows a preferred embodiment of the invention.

Conventional domestic (sewage) and industrial waste water treatment plants consist of one or more stages utilizing various methods and apparatus. Generally speaking, the first stage, which itself may be composed of several sub-stages, is adopted to remove most of the settleable solid wastes. These are composed of organic and inorganic constituents, with the composition being largely dependent on the nature of the industrial contaminant sources. The second stage is commonly an aerobic digestion treatment where, with aid of aerobic bacteria, much of the remaining waste materials is destroyed. A third stage is frequently included, and this ordinarily consists of an apparatus which simultaneously filters and oxidizes the waste water stream to reduce its biochemical oxygen demand (B. O. D.). A trickling filter is usually used for this third stage. A general review of sewage and industrial waste water treatment processes is included in Shreve, "Chemical Process Industries", pp. 59–62 (1945), and in the references cited therein. Also, in "Wastewater Engineering; Treatment Disposal and Reuse" by MetCalf and Eddy, Inc. (1979).

Flocculating agents are ordinarily used in the first or primary stage but may be included with advantage in the second stage. These agents, as earlier stated, are chiefly aluminum or ferric sulfate which, under sufficiently alkaline conditions, hydrolyze to form a sticky floc that aggomerates suspended solid waste particles. It is generally advisable to introduce an alkaline material such as lime or caustic soda, preferably the former alone, because of cost, to provide a pH between 6.0 and 7.0, the optimum pH being correlated in known manner with the nature of the flocculating agent, the amount of the agent, the concentration of the suspended solids, and the degree of clarification desired. Thus far the procedures described are more or less conventional, and are used in the vast majority of waste water treatment processes.

Turning to the drawing, an illustrative procedure for the treatment of a mixed domestic and industrial waste water is schematically depicted. It is assumed that, on the average, the daily influent is thirty million gallons, and this influent contains 48 milligrams per liter of settleable solids (as determined with an Imhoff cone) or, as otherwise determined, about 170 milligrams per liter of suspended solids. It has a Biochemical Oxygen Demand (B. O. D.) of about 190 milligrams per liter.

The influent or incoming waste waters enter the waste water treatment process via line 10c and are conducted to rotary impeller mixer 10, or equivalent, of conventional design. Here the aluminum sulfate solution is metered in via line 60a to supply about 300 p.p.m. of aluminum sulfate, and sufficient lime is introduced via line 10b to adjust the pH between 6.0 and 7.0.

The resulting mixture is passed via line 10a to a flocculating chamber or vessel 14 of conventional design so as to provide sufficient time for the aluminum sulfate to hydrolyze and form the aluminum hydroxide floc.

The stream from flocculating chamber 14 then passes via line 14a to settling basin or vessel 20, where the waste water stream remains for an average residence time of from about ten to about sixty minutes, for example about thirty minutes. The clarified water or effluent is withdrawn from settling basin 20 via line 20a at a rate of about 29.4 million gallons per day, and may be conducted to a second and/or third stage waste water treatment steps, as outlined earlier. This effluent contains about 0.5 milligrams per liter of settleable solids and 20 milligrams per liter of suspended solids, and has a B. O. D. content of about 150 milligrams per liter.

The bottom stream from settling basin 20 is withdrawn at a rate of about 600,000 gallons per day (0.6 million gallons per day) via line 20b. This bottom stream has a total content of solids from about 0.3 to 0.7 percent which is composed of a flocculant concentrate of the hydroxide of the flocculating agent, specifically aluminum hydroxide, together with occluded organic and inorganic waste solids. This stream is conducted to thickener 26, advantageously a Dorr-Oliver cyclonic thickener (or equivalent) of conventional design, where a further concentrated stream is withdrawn via line 26a, while the overhead is pumped back or recycled via line 26b to the influent conduit 10c. The thickened bottom stream from thickener 26 contains about 6 to 10 percent solids and is immediately pumped via line 26a to the sulfur dioxide absorption chamber 28. It is esential that the fresh floc be treated with sulfur dioxide as soon as possible to facilitate easy reaction between the sulfur dioxide and the flocculant concentrate. In some cases, it is highly advantageous to introduce in line 26a via line 26b some aluminum raw materials such as alumina, treated and untreated bauxite or similar ores, etc., to permit the addition of low cost aluminum to the process.

Sulfur dioxide absorption chamber 28 is one of a sequence of three absorption chambers 28, 30 and 40, each provided with plates, trays, scrubbers, etc., to promote intimate contact (countercurrently) with the stream of flocculant concentrate and the stream of reactive soluble gases such as sulfur dioxide and sulfur trioxide. Inasmuch as the liquid stream here under consideration contains substantial amounts of solids, the three absorption chambers 28, 30 and 40 are designed in known manner to avoid or minimize fouling of the chamber internals with solid materials. First sulfur dioxide absorption chamber 28 at ambient temperatures must remove nearly all of the sulfur dioxide present in the flue gas stream so that the sulfur dioxide discharged to the atmosphere via line 28b will meet the current Federal and State Air Pollution Standards.

The flocculant concentrate stream entering sulfur dioxide absorption chamber 28 via line 26a progresses through the chamber, then via line 28a to second sulfur dioxide chamber 30 through which it passes. Then via line 30a the liquid steam (concentrate) passes via line 30a to retention chamber 36 to provide a residence time of two or three hours for the continuation of the reaction between the aluminum hydroxide floc, sulfure dioxide and water (sulfurous acid). The acidity in retention chamber 36 should be built up to a pH about 1.0 at the prevailing ambient temperatures. The process stream is then conveyed via line 36a to the third and last sulfur dioxide absorption chamber 40, in which the temperature is moderately raised to from about 50° F. to about 104° F. by direct contact with the furnace flue gases. The process stream is withdrawn from chamber 40 for passage via line 40a to retention chamber 41, where the stream is retained for two or three hours for further completion of the reaction at temperatures between about 50° F. to about 104° F.

Air may be introduced in lines 50b, 40b, 30b and 26a and also into retention chambers 36 and 41 to promote the oxidation of sulfur dioxide to sulfur trioxide throughout the process which is immediately absorbed and reacted with water to form sulfuric acid for reaction with the aluminum hydroxide floc.

The hot furnace flue gases, consisting of nitrogen and unconsummed oxygen from the air, carbon oxides, sulfur oxides and traces of other gases, are passed via line 50b to the last sulfur dioxide absorption chamber 40 where the heat in these gases is spent in heating up the temperature of the concentrate in chamber 40 from about 50° F. to about 104° F. The sulfur dioxide gas already present in these flue gases and that evolved by elevating the temperature are combined and passed through the sulfur dioxide absorption chambers 40, 30 and 28 countercurrently to the liquid (concentrate) flow. The solubility of sulfur dioxide from 32° F. to 104° F. is given in *The 12th Edition of Lange's Handbook of Chemistry* (see Table 10-1 in Section 10, 1982). This table clearly shows the sharp drop in the solubility of sulfur dioxide with moderate increases in temperature, in that a temperature rise of a common ambient temperature of 41° F. to a moderate temperature of 77° F. will decrease the solubility from 19.3 to 9.4 grams per 100 grams of water, that is more than one half of the dissolved sulfur dioxide may be released by such a moderate rise in temperature. This combined stream of sulfur dioxide in the flue gases will be passed countercurrently to the concentrate for absorption in the water of the liquid stream.

The slurry stream of the waste solids and aluminum sulfate solution in retention chamber 41 is passed to mixer 42 of conventional design, to which lime is metered via line 42b to adjust the liquid to a pH of about 4.5 and pulverized sulfur containing coals are also metered to mixer 42 via line, 42c. In this pH range a substantial portion of the aluminum phosphates precipitate from the rather high concentrations of soluble aluminum and phosphates present. This combined slurry is then passed via line 42a to filter 44 of conventional design, where the waste solids, pulverized coal and precipitated aluminum phosphates are removed from the regenerated aluminum sulfate solution. The solids are then passed on to furnace 50 via line 44a for burning the organic materials including the toxic and B.O.D. materials in the waste solids and the sulfur compounds in the sulfur containing fuels, and for releasing the sulfur dioxide while drying the solid wastes and for decomposing the sulfite and sulfates present to yield sulfur oxides. Gases are conveyed from retention chamber 41 via line 41b to air line 50c, through which excess air passes to both burning zones of furnace 50 via lines 50c, 50e and 50f. Also, gases are passed from filter chamber 44 and the drying zone of furnace 50 to line 41b via lines 42d and 50d, respectively.

Furnace 50, as will be appreciated, may actually comprise two or more zones; in one of which the waste solids including the organic materials, the pulverized coal and the aluminum phosphates from filter 44 may be dried by contact with a portion of the hot gases from either or both of the two combustion zones; in another zone the dried solids are burned in an excess of air; and in the third zone the elemental sulfur may also be burned with an excess of air as an auxiliary source of sulfur dioxide. Furnace 50 is advantageously controlled by utilizing a substantial amount of excess air (oxygen) via lines 50c, 50e and 50f, so as to maximize the conversion of sulfur in the sulfur containing fuel as well as the elemental sulfur to sulfur trioxide rather than to sulfur dioxide. Ordinarily the combustion of the sulfur in the sulfur containing fuels and also elemental sulfur with excess air, in absence of any catalytically active materials produces a gas in which from 2 to about 10 percent of the sulfur oxides are in the form of the trioxide but by utilizing a somewhat higher percent excess oxygen than is normal, that is, to provide about 1–5 volume percent oxygen in line 50c, conversion to sulfur trioxide may be maximized. Modified furnaces of conventional design normally used in multiple hearth or fluidized-bed incineration may be suitable in this application.

Furnace 50 also contains a boiler to control the temperature of the flue gases passing to the last sulfur dioxide absorption chamber 40 in line 50b. Excess hot water and/or steam produced in the boiler may be used in the treatment plant or elsewhere. Appreciable amounts of sulfur dioxide and sulfur trioxide may be produced in furnace 50 from the drying and burning of the sulfur dioxide, sulfites and sulfates entrapped in the filtered concentrate and waste solids. Under controlled burning conditions relative to temperature most of the aluminum sulfate present may not be decomposed in the furnace. This soluble aluminum sulfate may be extracted as such from the furnace ashes by the use of the regenerated aluminum sulfate solution (or water).

The ashes obtained from furnace 50 may be passed via line 50a to mixer 56 of conventional design, to which is added via line 44b the regenerated aluminum sulfate solution from filter 44 and/or water via line 44c. This ash mixture is then passed via line 56a to trap or centrifuge 64 of conventional design. Where the insoluble solids are removed and passed via line 64b to landfill 68 for disposal and the aluminum sulfate solution is conveyed via line 64a to storage tank 60, where it is available for reintroduction to the waste water in mixer 10. The disposal of the solid wastes must be carried out in compliance with existing Federal and State regulations and laws. If water is used in place of the regenerated aluminum sulfate solution, this solution is passed from line 44b to line 64a and water is passed to line 44b via line 44c for use in mixer 56.

As will be noticed from the description of the revised procedure the innovation applied to this process consists of the following: rearrangement of the sulfur dioxide absorption chambers with retention chambers to increase the potential of this process by establishing a straight line gas-liquid absorption system through three absorption chambers; 28, 30 and 40; heating the liquid in the last (3rd) absorption chamber by using the hot furnace flue gasses to promote the evolution of the excess sulfur dioxide for recycling through the second and first absorption chambers, namely chambers 30 and 28, and to simultaneously decrease the lime requirements in the subsequent pH adjustments; partially neutralizing the pH to about 4.5 with lime to allow for the partial precipitation of aluminum phosphates; adding sulfur containing fuels (preferably pulverized coals) to provide fuel and sulfur to the waste solids; and using a boiler section in the furnace to control the heat passing to the last sulfur dioxide absorption chamber. A simple gas-liquid contact system may be used such as modified venturi scrubbers of conventional design in all of the sulfur dioxide absorption chambers with the first two chambers operating at nearly ambient (low) temperatures to stimulate ready absorption of the sulfur dioxide so as to permit the meeting of the Federal and State Air Pollution Regulations relative to the discharge of sulfur dioxide to the atmosphere and to build up the concentration of sulfur dioxide in the second absorption chamber, namely chamber 30, to attain a pH of about 1.0 which is required to promote the maximum amount of reaction in retention chamber 36. Also, the reaction of residual sulfur dioxide and the associated sulfurous acid with the aluminum hydroxide floc is further stimulated in sulfur dioxide absorption chamber 40 at the elevated temperatures and with the extended retention times in retention chamber 41. The elevated temperature of flue gasses and sulfur dioxide passing from chamber 40 to chamber 30 via line 40b will tend to raise the temperature of the concentrate in chamber 30, but the temperature of the concentrate in chamber 28, the first chamber, will not be appreciably raised by the warm flue gas via line 30b. That is, with an ambient temperature in chamber 28 effective absorption of sulfur dioxide in the first chamber can be attained to prevent the release of sulfur dioxide to the atmosphere via line 28b.

The addition of pulverized sulfur containing coals to the concentrate stream in mixer 42 has the following advantages in respect to the filtration operation: higher temperature in absorption chamber 40 and retention chamber 41 significantly aids the filtration or separation and the coal particles present will greatly improve the drainage capability of the filtered mat, which is normally sticky and gelatinous.

Even though the prime purpose of this novel process is the removal of suspended solids from waste-containing and naturally and public contaminated waters many secondary benefits of significance may be realized in that B.O.D., colored and toxic substances, bacteria, virus, etc. are partially removed and destroyed as well as low cost sulfur and energy are provided for other supplemental uses. Those auxiliary benefits may be made most attractive when tied in with the prime purpose of this process especially when combined with a combination of water treatment operations. Microorganisms and some dissolved substances coalesced by these flocculating agents are destroyed along with organic solids in the furnace, while the inorganic solid wastes and aluminum phosphates are sent to a properly operated landfill or to a land disposal field. Also, the treated waters may be safely sent to surface waters, or used for drinking or for industrial or agricultural uses. Also, this process provides a method for extracting aluminum and iron from low cost raw materials.

Whereas, most of the liquid and gaseous streams in this process often contain rather high concentrations of sulfur dioxide, the intense corrosive properties of these media throughout the process must be given careful consideration. Therefore, it is imperative that particular attention be given to the construction materials used in this novel process. However, due to the relatively low temperatures involved the use of plastic coated chambers and pipes is recommended to avoid high costs.

Although in the above example the flocculating agent is aluminum sulfate, it is frequently desirable to use iron (advantageously ferric iron) as the agent, either alone or in a mixture with aluminum sulfate. Iron rather than aluminum offers economies of raw material cost in some instances and also apparantly produces a somewhat heavier floc for more rapid settlings in settling basin 20. Make-up iron and/or aluminum may be added either in the form of the hydroxide or the sulfate via line 26a to sulfur dioxide absorption tower 28, as shown in the drawing, or may be introduced eleswhere as required or desired.

In addition, iron also appears to offer somewhat accelerated oxidation of sulfites and bisulfites, at least as compared to aluminum. For this reason it is often desired to use either iron alone, or aluminum containing some iron, as the flocculating cation constituent. Further, in the event it is found that such oxidation is slower than is desired for a particular installation and service, either a separate oxidizing vessel (in which molecular oxygen is bubbled through a tank or a sulfite or bisulfite containing stream located anywhere in the process), or the inclusion of a catalyst such as a trace of bromide ion may be used.

Another optional step, shown in the drawing, is the extraction of some or all of the ash leaving furnace 50 via line 50a for additional recovery of aluminum sulfate. This extraction may be conducted either with water alone or, optimally, with water containing some sulfurous acid to dissolve some of the aluminum sulfate in the ash. This procedure offers enhanced economies in that it minimizes the amount of makeup aluminum hydroxide or sulfate added to the system. Thus it has been shown that the method of the invention is effective, economical and highly advantageous, not only with respect to its localized treatment and recycle of the flocculating agent, but in the manner in which it facilitates disposing of the suspended solids and associated dissolved materials by concentration and extraction. An additional benefit is that the method of the invention permits higher concentration of flocculating agents to be used in the waste water treating process for enhancing separation of suspended solids, with the result that effluent 20a contains less of such solids than would otherwise exist. As a result less chlorine is necessary for the final treatment of the effluent. While the invention has been described in conjunction with a specific embodiment thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

I claim as my invention:

1. In a process for the treatment of domestic sewage and industrial waste waters containing suspended solids and phosphates wherein said solids are separated from said waste waters by introducing into said waste water a flocculating agent selected from the group consisting of the sulfates of iron and aluminum under neutral to weak acid conditions to effectively convert the flocculating agent to its hydroxide and thereby form a flocculating concentrate containing the hydroxide of said flocculating agent and said suspended solids, the improved method of recovering and recycling said flocculating agents and of disposing of said suspended solids which comprises: contacting said concentrate with at least one sulfur oxide gas in an amount sufficient to convert the hydroxide of said flocculating agent to a member of the group consisting of sulfates, sulfites, and bisulfites and with oxygen in an amount sufficient to convert said sulphites and bisulfites to water soluble sulfates to thereby redissolve said flocculating agent, said contacting including contacting said concentrate countercurrently in a first sulfur dioxide absorption chamber with a flue gas comprising sulfur dioxide and air produced in a second sulfur dioxide absorption chamber at ambient temperatures to absorb substantially all the sulfur dioxide present in said flue gas into said concentrate, contacting the concentrate containing absorbed surlfur dioxide countercurrently in said second sulfur dioxide absorption chamber with a flue gas comprising sulfur dioxide, sulfur trioxide and air produced in a third sulfur dioxide absorption chamber to reduce the pH of said concentrate to about 1.0, passing said concentrate to a first retention chamber for at least about 2 hours at ambient temperatures, contacting said concentrate countercurrently in said third sulfur dioxide adsorption chamber with a furnace flue gas stream containing sulfur dioxide, sulfur trioxide, and air, to raise the temperature of said concentrate to about 77° F., passing said concentrate to a second retention chamber for at least about 2 hours to complete the reaction of the sulfur dioxide with said concentrate, mixing said concentrate with an effective amount of lime and sulfur containing fuels to adjust the pH of said concentrate to about 4.5 and precipitate the phosphates of said flocculating agent, separating the resulting soluble flocculating agent from separated solids comprising said suspended solids, said phosphates, and said sulfur containing fuels, recycling said flocculating agent to said treatment process, and drying and burning said separated solids to form said furnace flue gas and disposable solids.

2. Process of claim 1 wherein said flocculating agent is aluminum sulfate.

3. Process of claim 1 wherein said flocculating agent is ferric sulfate.

4. Process of claim 1 wherein said flocculating agent is a mixture of aluminum and ferric sulfate.

5. Process of claim 1 wherein said flocculating agent is employed in combination with lime.

6. Process of claim 1 wherein at least part of the sulfur containing fuels consists of sulfur containing coals introduced to the concentrate stream prior to the separation of said solids from the sulfate solution.

7. Process of claim 1 wherein at least part of the sulfur containing fuels consists of sulfur containing oils or other liquid petroleum products.

* * * * *